United States Patent Office

3,563,870
Patented Feb. 16, 1971

3,563,870
MELT STRENGTH AND MELT EXTENSIBILITY OF IRRADIATED LINEAR POLYETHYLENE
Lu Ho Tung, Harold J. Donald, and Robert J. Caiola, Midland, Mich., assignors to The Dow Chemical Company, Midland, Mich., a corporation of Delaware
No Drawing. Filed Jan. 23, 1969, Ser. No. 793,541
Int. Cl. C08d 1/00, 3/04; C08f 1/16
U.S. Cl. 204—159.2
5 Claims

ABSTRACT OF THE DISCLOSURE

Melt strength and melt extensibility of linear polyethylene are improved by exposing said polyethylene to a small dose of high energy radiation.

BACKGROUND OF THE INVENTION

This invention relates to methods for improving certain physical properties of linear polyethylenes, and more particularly, to processes for radiating linear polyethylenes to improve the melt strength and melt extensibility thereof.

The thermoplastic organic resin films, particularly films of olefin polymers, are widely used as packaging materials because of their low vapor transmission properties and resistance to mechanical and chemical deterioration.

In more recent applications of films or sheets of the olefin polymers, it has been desirable to improve the high temperature tensile strength, so-called melt strength or melt tension, of said films or sheets. In the past it has been shown to crosslink polymer molecules, and thereby increase the melt tension of the polymer by exposing the polymer to relatively large doses of high energy radiation, i.e., greater than about 2 megarads. It also has been shown that olefin polymer molecules can be crosslinked by heating or irradiating the polymer in the presence of a crosslink-promoting agent, e.g., peroxides, metal complexes and the like.

Such crosslinking of olefin polymers by the aforementioned conventional methods has the additional, and often desirable effect of decreasing solubility of the polymers and reducing the melt flow of the polymers at given temperatures. Unfortunately, however, as a result of crosslinking the polymer molecules, an undesirable decrease in melt extensibility, so-called ease of flow, generally accompanies the desired increase in melt strength and elastic modulus. Raff and Doak, Crystalline Olefin Polymers, vol. 20, part 2, Interscience Publishers, New York, 324–325 (1964). As a consequence of this decrease in melt extensibility, sheets or strands of the crosslinked polymer cannot be drawn to lengths which are often required in the fabrication of film or fibers.

In view of the absence of method in prior art for treating olefin polymers so as to increase both melt extensibility and melt strength, it would be highly desirable to provide such a method.

SUMMARY OF THE INVENTION

In accordance with the present invention melt extensibility and melt strength of olefin polymers are increased by a method comprising exposing a linear polyethylene to a dose of high energy radiation ranging from about 0.05 to about 0.3 megarad. A rad is a unit of absorbed energy equal to 100 ergs per gram of material irradiated; thus the specified irradiation dosage corresponds to from about 5000 to about 30,000 ergs per gram of material irradiated. Polyethylenes treated according to the method of this invention are very useful in the fabrication of sheets, films, blown tubing, pipes, bottles and other shaped articles.

DESCRIPTION OF THE PREFERRED EMBODIMENTS

Olefin polymers suitably employed in the practice of this invention are linear polyethylenes having densities ranging from about 0.95 to about 0.97 and melt indexes as determined by ASTM D–1238–65T(E) ranging from about 3 to about 13 decigrams/minute, preferably from about 6 to about 9 decigrams/minute. Such polyethylenes can be made by low pressure polymerization processes which are well known in the art.

Conventional amounts of various additives such as fillers, antioxidants, stabilizers, etc. are optionally employed in the practice of this invention. Such additives, when used, are mixed with polymer by employing conventional mixing devices such as a Banbury mixer, extruder, etc.

The shape or form of the polyethylene during irradiation is not particularly critical. However, it is generally desirable to carry out irradiation on polyethylene in form of particles having diameters less than one quarter of an inch, for example, finely divided powders, spherical beads, cylindrical pellets and the like. During irradiation it is also generally desirable that the particles to be irradiated be spread out in layers of one inch or less in order to assure that a relatively large majority of the particles be exposed to the specified amount of radiation.

The high energy radiation suitable for use in treating polyethylenes according to the method of this invention can be obtained from any of various high energy sources and can be of various types whether regarded as having corpuscular or wave form. By the term "high energy radiation" is meant a high intensity radiation having a voltage greater than 0.3 mev., preferably from about 1 to about 10 mev. Representative types of radiation suitable for the purposes of this invention are alpha rays, beta rays, gamma rays, X-rays, electron beams, high energy neutrons and the like including radiations such as thermal neutron.

The dosage of radiation employed in the method of this invention is necessarily very small. Generally, suitable radiation doses range from about 0.05 to about 0.25 megarad, with the most noticeable improvement in melt strength and melt extensibility occurring when the specified polyethylene is exposed to doses from about 0.05 to about 0.15 megarad. At dosages above about 0.3 megarad, the melt strength of the polyethylene is increased, but melt extensibility is correspondingly decreased. At dosage below about 0.05 megarad, increase in melt strength and melt extensibility, if any, is not readily detectable.

The requested high energy radiation can be supplied from any of the well-known sources. Examples are the electro-mechanical devices for producing high velocity particles such as a Van de Graaff generator, a resonant transformer, a cyclotron, a betatron, a synchrotron, a synchrocyclotron, or a linear accelerator, X-ray tubes, and radioactive isotopes emitting beta particles (high-velocity electrons) and/or gamma rays. One of the most convenient sources of high energy radiation for industrial practice of this invention is a Van de Graaff generator. A particularly convenient arrangement involves adjusting the generator to provide a beam of 2 mev., electrons at about 250 microamperes intensity. To do this a vacuum of the order to $10^{-6}$ mm. Hg is required. The beam is shaped by a deflector coil so that at 20 centimeters below the window it is approximately 4 cm. x 20 cm. in cross section and provides a dose of about 0.6 megarad per second in polymeric material of the type used in this invention. A convenient method for irradiating the polymer is to place the shaped article on a mechanically movable table which is passed under the beam in the direction of its short dimension at a rate of 48 cm. per sec.

Thus one pass through the beam takes 0.0825 second and provides a dose of about 0.05 megarad.

While a high-velocity electron beam from a Van de Graaff generator, as described, is the preferred form of the high energy radiation required in this invention, other sources of high-velocity electrons or of X-rays, beta particles, or gamma rays can be used. As those skilled in the art of radiation will appreciate, several factors are involved in substituting one kind of radiation for another. But, knowing the amount of radiation (expressed as rads) required to be absorbed by the irradiated material and its absorption coefficient, the irradiation geometry of a system and the duration of irradiation can be calculated for an available source yielding radiation having a characteristic energy level and intensity.

The temperature at which the irradiation process is carried out is not critical. It can range from below room temperature to temperatures somewhat above the melting point of the starting polymer. It is usually convenient to carry out the irradiation at ordinary room temperatures.

Polyethylenes irradiated according to the method of this invention are readily shaped by any one of several conventional means, for example, extrusion, compression and injection molding, rotational molding and the like. Illustratively, the irradiated polyethylene is fed into a screw-type extruder equipped with a sheet die and is extruded in the form of a clear flexible sheet which may be drawn down to form a film having an average thickness less than one-twentieth the thickness of the original sheet. In addition the irradiated polyethylene in heat-plastified form may be extruded through an annular die, blown into a bubble, cooled, collapsed and cut into film of desired length and width.

The following examples are given for the purposes of illustrating the invention and should not be construed to limit the scope thereof. In the specification and claims all parts and percentages are by weight unless otherwise indicated.

EXAMPLE 1

Two samples of powdered linear polyethylene having a density of 0.965 and a melt index as determined by ASTM D-1238-65T(E) of 8.1 decigrams/minute are subjected to high energy electrons from a 1 mev. Van de Graaff generator to doses of 0.1 and 0.15 megarad, respectively (at 0.05 megarad/pass).

The melt index, melt tension, and melt extensibility of the irradiated samples are measured and recorded in Table I.

For the purposes of comparison, a sample ($C_1$) of the polyethylene used in Example 1 which is not irradiated is tested according to the test methods used in Example 1 aid the results are recorded in Table I.

TABLE I

| Sample Number: | Melt index, decigrams /min.[1] | Melt tension, gram[2] | extensibility, ft./min.[3] | Radiation dose, megarads |
|---|---|---|---|---|
| 1 | 6.4 | 0.65 | 1,000 | 0.15 |
| 2 | 6.6 | 0.6 | 300 | 0.10 |
| $C_1$[4] | 8.1 | 0.4 | 250 | 0.00 |

[1] As determined by ASTM D-1238-65T(E).
[2] Measured as the number of grams of tension required to draw a strand of polymer at 190° C. from an extrusion die through a circular orifice having a diameter of 0.0825 inch at a drawing rate of 25 ft./minute. The melt tension apparatus consists of: (a) a melt indexer as described in ASTM D-1238-65T, (b) a compressing device bearing on the piston of said indexer, said device capable of forcing the piston toward the die of the indexer at a rate of 1 inch/minute, (c) a take-up roll for winding up and drawing the strand as the strand leaves the die, and (d) a strain gauge capable of measuring the strain in grams of the strand as the strand is drawn from the die at the specified rate of 25 ft./minute.
[3] Measured as the ft./minute at which the strand can be drawn at 250° C. before breaking. The drawing apparatus is the same used in (2) except that an air ring is mounted 1¾" from the die of the indexer.
[4] Not an example of the invention.

EXAMPLES 2-6

Several linear polyethylene samples having different melt indexes and densities as shown in Table II are irradiated with a dose of 0.05 megarad using the apparatus used in Example 1. The irradiated samples are tested for melt tension and melt extensibility, and the results are recorded in Table II.

TABLE II

| | Melt index, decigram/min.[1], radiation | | Melt tension, gram,[2] radiation | | Melt extensibility ft./min.,[3] radiation | |
|---|---|---|---|---|---|---|
| | Before | After | Before | After | Before | After |
| Sample No: | | | | | | |
| 2 | 8.2 | 7.1 | 0.7 | 1.1 | 1,000 | 1,500 |
| 3 | 7.4 | 6.2 | 0.8 | 1.1 | 400 | 750 |
| 4 | 8.3 | 5.4 | 0.6 | 1.1 | 450 | 1,100 |
| 5 | 6.9 | 6.2 | 0.9 | 1.1 | 700 | 1,400 |
| 6 | 8.6 | 6.5 | 0.8 | 1.5 | 280 | 750 |

[1,2,3] Same as in Table I.

What is claimed is:

1. A method for improving melt strength and melt extensibility of polyethylene comprising the steps of exposing polyethylene having density ranging from about 0.95 to about 0.97 and melt index as determined by ASTM D-1238-65T(E) ranging from about 3 to about 13 decigrams/minute to a dose of high energy radiation ranging from about 0.05 to about 0.15 megarad and thereafter shaping the irradiated polyethylene by extrusion, compression molding, injection molding, or rotational molding means into the form of an article.

2. The method according to claim 1 wherein the polyethylene has a melt index ranging from about 6 to about 9 decigrams/minute.

3. The method according to claim 1 wherein the shaping step comprises extruding the irradiated polyethylene.

4. The method according to claim 3 comprising the steps of exposing polyethylene having density ranging from about 0.95 to about 0.97 and melt index as determined by ASTM D-1238-65T(E) ranging from about 3 to about 13 decigrams/minute, said polyethylene in the form of particles having diameters less than one-quarter of an inch, to a dose of high energy radiation ranging from about 0.05 to about 0.15 megarad and thereafter extruding the irradiated polyethylene in the form of a clear flexible sheet capable of being heat plastified and drawn down to a film having an average thickness less than one-twentieth the thickness of said sheet.

5. The method for improving the melt strength and melt extensibility of polyethylene according to claim 1 comprising the steps of (1) exposing polyethylene having density ranging from about 0.95 to about 0.97 and melt index as determined by ASTM D-1238-65T(E) ranging from about 3 to about 13 decigrams/minute to a dose of high energy radiation ranging from about 0.05 to about 0.15 megarad, (2) thereafter shaping the irradiated polyethylene by extrusion, injection molding, compression molding or rotational molding means into the form of an article, and (3) extending the shaped article at a rate greater than that which can be achieved with said polyethylene before radiation.

References Cited

UNITED STATES PATENTS

| | | | |
|---|---|---|---|
| 3,376,238 | 4/1968 | Gregorian et al. | 204—159.2 |
| 3,099,611 | 7/1963 | Stevens | 204—159.2 |
| 2,981,668 | 4/1961 | Brasch | 204—159.2 |
| 3,144,398 | 8/1964 | Rainer et al. | 264—22 |

OTHER REFERENCES

Chapiro, Radiation Chemistry of Polyermic Systems, Wiley, pp. 424–426 (1962).

SAMUEL H. BLECH, Primary Examiner

R. B. TURER, Assistant Examiner

U.S. Cl. X.R.
260—94.9; 264—22